Patented July 9, 1940

2,207,432

UNITED STATES PATENT OFFICE 2,207,432

VARNISH AND PROCESS OF MAKING THE SAME

Karl H. Fulton, Jackson Heights, N. Y., and George L. Ball, Pittsburgh, Pa., assignors to Combustion Utilities Corporation, New York, N. Y., a corporation of Maine No Drawing. Application April 8, 1929, Serial No. 353,682

29 Claims. (Cl. 260—18)

The present invention relates to varnish and lacquer bases containing resins of the phenol formaldehyde type which are soluble in fatty oils and to methods for preparing the same. It is of special utility in connection with the preparation of baking lacquers and enamels containing normally slow-curing resins of the phenol formaldehyde type such as are obtained from the formaldehyde treatment of primary tar distillates obtained from bituminous coal and the like under suitable conditions.

Most of the phenol formaldehyde resins suitable for use in varnish making have the undesirable property of being insoluble or substantially so in the ordinary fatty oils, such as linseed oil, tung oil, and the like normally employed in varnishes. Since however it is highly essential that any resin employed in varnish making must have a high degree of solubility in the oily vehicles normally employed in varnish making, the use of resins of the phenol formaldehyde type in this field has been heretofore distinctly limited. Furthermore where alcohol such as ethyl alcohol is employed in considerable proportions as solvent or diluent for the said phenol formaldehyde resins, the mixture is not soluble in linseed oil due to the insolubility of the latter in the said alcohol. Those phenol formaldehyde resins which are at least partially soluble in the usual varnish oils possess the objectionable property of being insoluble or substantially so in benzine, solvent naphtha, turpentine oil, and the other volatile solvents normally employed for diluting the usual varnishes to prepare them for use. This renders them unsuitable for the manufacture of many oil varnishes.

Certain methods are at present known for rendering certain phenol formaldehyde resins soluble in linseed oil by heating mixtures of these resins and linseed oil with natural resins such as rosin or with fatty oils. The compositions thus prepared however are unsuitable for many purposes due to the fact that the substances added remain in the finished product and undesirably modify the essential character of the composition and the varnish or lacquer base made therefrom. Moreover, the prior known mutual solvents such as rosin or colophony are not suitable for rendering phenol formaldehyde resins of the type made from primary coal tar distillates soluble in linseed oil and similar fatty oils. Where castor oil has been employed as a solvent and plasticizer for phenol formaldehyde resins, it has been found necessary in order to get a product of satisactory viscosity or flow characteristics to use so much of the castor oil that the product is over plasticized and the speed of cure of the resin is greatly reduced so as to seriously interfere with the use of the composition in connection with standard equipment for mechanically applying varnish or lacquer films to materials to be coated therewith under the usual conditions of present day shop practice.

Among the principal objects of the present invention are to provide a high boiling mutual solvent for phenol formaldehyde resins and fatty oils which does not undesirably effect the physical properties of a baking lacquer and varnish or the like containing them, and which improves the adhesion thereof to metal surfaces and the like to which they are applied; to provide a new phenol formaldehyde resin-linseed oil reaction product containing pine oil which is soluble in varnish oils, benzine, benzol, solvent naphtha, and the like, and which after baking is substantially odorless; to provide in an improved manner for plasticizing or otherwise modifying the physical properties of a synthetic resin by means of a material normally insoluble therein and capable of reacting therewith, such as a liquid linoxyn base, in the presence of a common solvent of boiling point above the temperature at which the said reaction normally occurs; to provide in an improved manner for retarding the conversion of phenol formaldehyde resins of the fusible type to the infusible state during the heating of a composition containing the same, and to retain them in fusible form; to provide an improved lacquer base composition which on curing has a high resistance to alkali solutions and a high dielectric value; to provide an improved water proof lacquer or varnish possessing certain lubricating properties so that it will not adhere to a mold which contains it; and to provide an improved varnish or lacquer base containing a phenol formaldehyde resin and which is approximately neutral and which can be readily mixed with basic pigments and with organic dyes without causing "livering" of the varnish.

The present invention is based upon the broad discovery that it is possible to convert all phenol formaldehyde resins, including those made from tar oils such as the distillates from either high temperature—or low temperature—coal tar into resinous products soluble in drying and semi-drying oils of the type used in the preparation of varnishes, lacquers and enamels, by first treating the said synthetic resins or resin-forming materials with cyclic terpene alcohols such as those of the terpan or methan group or of the camphan group, or with natural or artificial compositions containing the same. Pine oil which is produced by the steam distillation of pine wood is an example of such a composition. The pine oil is known to consist largely of the cyclic terpene alcohol, terpineol, together with other related alcohols and with phenol esters and terpenes. It is preferable to first dissolve the phenol formaldehyde condensation product in suitable amounts of pine oil while heating the mixture to temperatures of 150° F. or higher. However the said synthetic resin is soluble in the pine oil in substantial amounts at normal atmospheric temperature and may be prepared without heating by the use of strong agitation. The solution of phenol formaldehyde resin in pine oil or its equivalent as disclosed above, is then mixed in suitable proportions with a varnish or enamel base material such as linseed oil, China-wood oil, soyabean oil, perilla oil, and the like. Among other suitable varnish base materials which may function also as plasticizers for the phenol formaldehyde resins when treated in the manner disclosed, may be mentioned turpentine, corn oil, menhaden oil, rape seed oil, and other drying and semi-drying oils. These varnish or enamel bases are preferably heat treated and oxidized or polymerized as by blowing with air or the like until they are sufficiently "reduced" and have been largely converted into linoxyn bases or the like but are still in the liquid state in which they are soluble in fatty oils and in the usual varnish solvents. Other plasticizers may be added to these varnish base materials, such for example as cottonseed pitch, palm pitch, stearin pitch and other vegetable pitches, stearin and stearic acid. The solution of synthetic resin in pine oil is mixed with the varnish base, and the mixture is then heated in a vessel provided with a reflux condenser, to temperatures preferably in the range of from 150° F. to 450° F. until a reaction has occurred between the various ingredients of the mixture and a clear homogeneous liquid product is obtained which when cooled, is transparent and is soluble in solvent naphtha, benzol, petroleum hydrocarbons, and the like. It is particularly well suited for use in the preparation of baking enamels, and a varnish film made from this product is, after baking the same, tough, elastic, insoluble in the usual volatile solvents, and resistant to dilute alkali solutions and to acids. The pine oil or its equivalent also appears to function as a fluxing agent so as to keep the reaction mixtures in liquid condition during the reaction between the synthetic resin and varnish base which proceeds rapidly at temperatures around 350° F. and somewhat more slowly at lower temperatures such as 250° F. It is not essential that the mixture of phenol formaldehyde resin and linseed oil or the like be heated to the reaction temperature during the step of mixing the said synthetic resin in pine oil with the linseed oil or other varnish base. Both the latter and the synthetic resin are readily soluble in the pine oil at lower temperatures, so that the composition may be prepared at temperatures little if any above room temperature. It is preferable that temperatures be employed which are sufficiently high to effect the elimination of any moisture that may be taken up by the composition from the air during the agitation attending the mixing of the same. In such cases, the product is suitable for use as a baking lacquer or enamel, the necessary reaction between the ingredients of the composition occurring at the time of baking the lacquered or varnished object. The baking step, which is generally carried out at temperatures in the range of from 250° F. to 450° F. apparently then functions both to induce the interaction between the ingredients of the composition and to "cure" or convert the phenol formaldehyde resin to the insoluble, infusible form. The baking is preferably carried out in the presence of air. If the object coated with the lacquer is made of metal, baking temperatures of from 350° F. to 450° F. are preferable, at which temperatures most of the pine oil is volatilized and removed from the lacquer film. Any remaining traces thereof in the film have apparently been modified in some manner, and the baked film is free from odor. In instances where materials of wood, paper, and the like are coated or impregnated with these lacquers, it is necessary to carry out the baking operation at temperatures sufficiently low to avoid injury to the material by the heat employed. In such instances, baking temperatures in the neighborhood of 270° F. may be employed. Where the object is to be impregnated with the lacquer, it is often desirable to first dry the object under vacuum and thereafter to treat it under pressure in a bath of the lacquer. The impregnated object may then be baked either at atmospheric pressure or under increased pressure in a closed vessel held at the desired temperature.

An important function of the pine oil is that of rendering the phenol formaldehyde resin and the varnish base not only soluble in each other, but also soluble in the usual water-insoluble varnish solvents such as solvent naphtha and the like. This is a valuable property possessed by the pine oil since such solvents as alcohol, normally required for dissolving synthetic resins of the phenol formaldehyde type are not only relatively expensive, but are quite hygroscopic and are therefore unsatisfactory for many uses, as for example, in the preparation of a coating composition used in connection with an automatic film coating apparatus where it is essential that a relatively non-hygroscopic liquid of uniform specific gravity and viscosity be employed. Pine oil has a very low degree of hygroscopicity compared with that of alcohol, and its ready miscibility with low priced non-hygroscopic varnish solvents such as solvent naphtha, makes possible the use of relatively large proportions of these solvents in lacquer compositions containing synthetic resins of the phenol formaldehyde type and pine oil or its equivalent. Many of the said non-hygroscopic solvents have flash points as high as 100° F. or above, and their employment in the aforesaid varnishes and baking lacquers which is made possible by the solvent action of the pine oil very materially reduces the fire hazard which is so vital a factor in connection with the preparation and use of these products.

The following specific examples will serve to illustrate certain preferred modifications of the invention. These examples are given solely for the purpose of illustration. They are in no sense to be considered limitations as to the scope of the invention, which, as previously indicated resides in the broad use of materials containing alcohols of the terpan group, such as pine oil, as high boiling solvents and converting agents for rendering phenol formaldehyde resins and certain modifying agents for the said resins which are normally insoluble therein, such as varnish oils, mutually soluble to form lacquers and the like, which solvents are readily removable at least in major part from the lacquer at the temperatures obtained during the baking of the lacquer after its application to the material to be coated therewith.

*Example 1.*—4½ pounds of a phenol formaldehyde resin (made by treatment of 94 parts of phenol with 29 parts of trioxymethylene and the reaction product condensed during three hours at a temperature of 110° C.), was dissolved in one-half gallon of steam distilled pine oil (Navy specification) having a boiling range of 374° to 428° F. (190°–220° C.), and the mixture was then heated to 350° F., in a vessel equipped with a reflux condenser. To this solution was then added one gallon of liquid linseed linoxyn base dissolved in two gallons of a mixture of equal parts of solvent naphtha and ethyl acetate. The heating of the mixture at the above temperature was then continued until a sample thereof formed a clear film when baked on glass. The resultant product is light in color and is somewhat viscous when undiluted with solvents.

*Example 2.*—4½ pounds of a phenol formaldehyde resin prepared from the total distillate of a primary coal-tar by treatment thereof with formaldehyde, was dissolved in one gallon of pine oil and heated to a temperature of approximately 150° F. The above mentioned phenol formaldehyde resin employed was relatively slow curing and contained a substantial amount of a non-curing resin. To the above solution was then added 1½ gallons of liquid tung linoxyn base dissolved in two gallons of high-boiling solvent naphtha. The mixture was then heated to 350° F. until a sample thereof formed a clear film when baked on glass. During the said heating the volatile products and any water present were removed as rapidly as formed. The resultant lacquer base was of a dark brown color, and could be thinned with coal tar hydrocarbons or the like to yield a clear solution.

*Example 3.*—A phenol formaldehyde resin, prepared from the tar acids of a primary coal-tar distillate having a boiling range up to 300° C. by heating an alkali phenolate solution of the tar acid components of the said distillate with formaldehyde in the proportions of equimolecular amounts of the said tar acid components of the distillate and of formaldehyde, was dissolved in pine oil in the proportions of 4¼ pounds of the resin to two gallons of pine oil, the said solution being facilitated by heating to approximately 150° F. To this mixture was then added 2½ gallons of a "linoxyn resoleate" solution, one example of which contained 36% of liquid linseed linoxyn base, 4% of a metallic resinate such as lead or manganese resinate, and 60% of high boiling solvent naphtha. The "resoleate" solution was preferably prepared by first heating the mixture of liquid linseed linoxyn base and resinate to a suitable temperature, thereafter cooling the mixture and adding the solvent naphtha. The composition thus prepared was then heated to a temperature of approximately 350° F., for a prolonged period in a vessel equipped with a reflux condenser, during which time a reaction between the components thereof occurs. This is evidenced by the fact that the composition when applied in a film to a surface to be coated therewith, especially when baked thereon, is not only elastic and adheres readily to the said surface, but it is insoluble in the usual solvents for its components, and is resistant to alkali solutions. The phenol formaldehyde resin itself on the other hand is not highly resistant to alkali, and the linoxyn resoleate solution per se does not yield an insoluble film when baked for a short period of time, nor is it resistant to alkalies when either air-dried or baked. The resultant resinous composition is readily soluble for example in substantial amounts of common solvents such as solvent naphtha, benzol, benzine and the like. It is particularly suitable as a base for baking lacquers and varnishes, and when subjected to baking temperatures in the neighborhood of 400° F. to 450° F., as for example when coated upon metal or other materials not injured by exposure to such temperatures, it gives a lacquer film having excellent properties of elasticity and strong adhesion to metal surfaces, is highly resistant to solvents and to alkali solutions and acids. Moreover, the said varnish is free from the odors normally associated with phenol formaldehyde resins and with linseed oil lacquers. The non-curing portion of the phenol formaldehyde resin has been so converted or modified by the treatment that the resultant lacquer apparently does not contain any non-curing synthetic resins. The baked film prepared from this composition has a relatively high dielectric value. A sample of this material showed a dielectric value of 3000 volts/mil.

*Example 4.*—A very high grade lacquer or baking varnish of great strength and having valuable physical properties has been prepared by mixing one part of commercial phenol with one part of a 40% formaldehyde solution and one part of steam distilled pine oil and heating the mixture for two hours to a temperature around the boiling point of water, in a vessel equipped with a reflux condenser. The condenser is then removed and the water content of the mixture is evaporated away. The remaining product is a very thick viscous liquid which may be cured by heating at temperatures of approximately 230° F. for four hours and yields a very hard, tough transparent resinous composition. The said viscous liquid may if desired be diluted with pine oil, as for example in the proportion of one part of the said liquid to one part of pine oil and the resultant product is a relatively thin liquid which is curable by heating it to about 230° F. and when spread in a thin film and cured in this manner yields a hard, tough transparent film which is highly resistant to abrasion and to impact forces and is resistant to the usual dilute and alkaline solutions.

The varnish or lacquer is highly adaptable for use with metal powders such as aluminum and the like, as well as for all purposes for which an inert filler or a pigment or the like is desired in conjunction with a binding and baking enamel or lacquer. If two pounds of aluminum powder is added to a gallon of the lacquer or varnish prepared according to Example 3, a stable aluminum paint is obtained which will keep indefinitely without deterioration due to the interaction of the paint vehicle with the aluminum which frequently occurs in aluminum paints now on the market. If the aluminum baking lacquer is to be applied to an object by means of spraying, the lacquer such as that of Example 3 may if desired be suitably diluted with a volatile solvent, and a somewhat larger amount of aluminum powder is then employed. Satisfactory results are obtained by mixing together ¾ gallon of the lacquer prepared according to Example 3, ¾ gallon of solvent naphtha, and two pounds of aluminum powder. The aluminum powder is preferably added to the cold lacquer solution, and the mixture is agitated until thorough intermixture is obtained.

As already indicated, atmospheric temperatures may be employed in preparing lacquer compositions comprising phenol formaldehyde resins and fatty oils, when pine oil or the like is used as a mutual solvent or diluent. To these lacquers may be added other ingredients soluble in the pine oil, such as natural or artificial resins, gums, waxes, and the like, due to the high solubility of these materials in the pine oil. Since in order to produce a lacquer or varnish having the desired properties, it is necessary at some stage in the process to heat the mixture to a temperature which will permit the aforementioned reaction to occur between the phenol formaldehyde resin and the other ingredients—which reaction may occur at temperatures around 150° or above—it is preferable to employ this solution as a baking lacquer in which application the material coated therewith is afterwards subjected to a suitable baking heat. Temperatures of 400°–450° F. are preferred in instances where it is desired to remove at least the major part of the pine oil. During such baking, the desired reaction occurs between the ingredients of the lacquer, and a lacquer film having the desired characteristics is obtained. Considerable amounts of pine oil which are volatilized during this baking may be recovered undecomposed by the use of suitable condensing and liquid recovery equipment in connection with the baking ovens. Because of the relatively high boiling point of the pine oil, it remains in the lacquer base during a considerable part of the baking step and keeps the said lacquer in a flowable state during at least the initial part of the baking step, thus permitting it to distribute itself in a uniform smooth film upon the surface coated therewith.

It is possible to modify the formula of Example No. 3 by substituting for a part of the blown linseed oil or linoxyn base substantial amounts of coumarone resin and/or other natural and synthetic resins. When relatively small amounts of coumarone resin (say 4%) are substituted for a part of the linseed linoxyn base of Example 3, a lacquer or varnish is obtained which, when baked in place on metal or other objects coated therewith, produces a clear transparent coating of great toughness and elasticity, is strongly adherent to the metal and possesses a homogeneous, hard surface of high gloss and smoothness not heretofore obtainable by the employment of compositions of this type so far as we are aware. It is insoluble in the known solvents and in ordinary acids and alkalies, and it is highly inert chemically.

Lacquer bases prepared according to this invention may be mixed with suitable pigments, fillers and with suitable dyes to yield lacquers or enamels of the desired color and other physical properties. The various components of the lacquer or varnish base prepared according to the present invention have relatively low acid numbers,—(the linseed oil or linoxyn base has an acid number of around 12 and the phenol formaldehyde resin is substantially neutral); and the reaction between the components of the varnish base during the process of making the same apparently further lowers the acid value of the said base, so that the lacquer base prepared according to Example 3 has an acid number of around 2.

Where a lacquer or varnish is desired for coating fabric or paper such as that used in the production of bottle cap liners and the like—as when a water repellant surface coating or one resistant to corrosive agencies is desired—a suitable amount of a wax or waxy substance such as paraffin, carnauba wax, candelilla wax and the like may be compounded with the other ingredients of the lacquer base. This is usually accomplished by mixing the wax with the linseed oil solution in pine oil before preparing the lacquer, though it is possible to add the wax directly to the finished lacquer. In the latter case the wax is dissolved in a suitable solvent and is dissolved in the varnish base in such form by the application of a slight amount of heat. The wax and the phenol formaldehyde resin may be dissolved in a mutual solvent such as pine oil prior to the addition of the drying oil or linoxyn base thereto. The best results have been obtained by the use of paraffin wax in these compositions in which the said wax is present in the proportion of 2% or less of the solid ingredients of the lacquer or varnish base. Percentages of paraffin wax much in excess of 2% appear to separate out from the lacquer film upon baking the same. Carnauba and candelilla waxes on the contrary may be used in much greater amounts without the said objectionable effects. A satisfactory water resistant composition for coating proper may be prepared by mixing the varnish described above in Example 3 with 1% of paraffin wax, (based on the other solids in the varnish). In place of the 1% of paraffin wax, similarly good compositions are obtained by using 8% of candelilla wax or of carnauba wax. When waxes of vegetable origin are employed, they are preferably used in larger proportions than where paraffin wax is used, in order to properly make use of the property that these waxes possess (in smaller degree than paraffin wax) of lubricating the surface of the coating in which they are incorporated. The wax-containing lacquer may be prepared by a method similar to that indicated in Example 4 by adding the wax to the other ingredients of the mixture prior to the heat treatment. Surfaces coated with the aforesaid varnish containing these waxes do not tend to adhere to each other as is the case where a composition is employed that is free from waxes or materials have a similar action. Rolls of coated paper or of cloth may therefore be safely coated with these compositions and stored without danger of damage from sticking together of the different plies of stock. Furthermore, the surface film of wax acts as a protective film to reduce or prevent any oxidizing effect upon the varnish film by the air, in this manner materially reducing the fire hazard ordinarily associated with the storage of combustible material of this character. At least a portion of the wax apparently sweats out or comes to the surface of the varnish coating during the drying or setting thereof, and it forms a smooth film of greasy texture that acts as a protective covering for the varnish and the object coated therewith particularly when used with aqueous solutions. Other resinates and substances can be included in the lacquer base disclosed above or substituted for the metallic resinate therein. Ester gum, and rosin yield satisfactory products when substituted in this manner.

It will be obvious that the solution of phenol formaldehyde resin in pine oil or the like may be used dissolved alone with or without the presence of volatile solvents, or a solution thereof in fatty oils and the like may be employed. The lacquer composition prepared in the manner described may be combined with various vehicles in accordance with the use for which it is intended. Solvent naphtha, turpentine and the like are especially suitable where the composition is to be used as a baking lacquer or enamel for coating metal sheets and wire such as copper and aluminum electrical conductors, or for application to wood, paper and the like.

Other curable synthetic resins such as the Glyptal type resins or polyhydric alcohol-polybasic acid resins, urea resins, ketone resins and the like are adaptable for use in the preparation of the varnish compositions according to the present invention. The pine oil here acts as a mutual solvent for both the synthetic resin and the drying oil employed; and the pine oil may thereafter be removed by heating or it may be permitted to remain in the composition, depending upon whether or not the latter is to be used as a baking varnish or as an air-drying varnish. For example, 5 grams of a Glyptal resin is mixed with 20 cc. of steam distilled pine oil and the mixture then heated. Drying oils such as blown linseed oil of the type heretofore described may be added to the solution of Glyptal resin in pine oil and the mixture then heated to 350° F., the volatile products being removed as formed. The final liquid product or varnish base which remains may be thinned with coal tar hydrocarbons or the like to yield a clear solution. If desired, the formation of the Glyptal resin and its solution in pine oil may be simultaneously effected, as for example, by mixing one part of phthalic anhydrid with one-half part of glycerine and three-fourths part of pine oil and heating the mixture to temperatures sufficient to cause the resin forming reaction to take place and to remove the water and other volatile products formed during the reaction.

By the term "phenol formaldehyde condensation products" and similar terms found in the specification and claims, we aim to designate not only the products made by reaction of phenol and formaldehyde, but similar products made from homologues of phenol or phenolic bodies, or other equivalents, or mixtures containing the same, such as tar acid containing distillates of coal-tar made by either a high temperature or a low temperature distillation of bituminous coal and the like. Phenol formaldehyde resins suitable for use in the present process may also be prepared in various other ways as already indicated, as for example by the treatment with an aldehyde-containing substance of a phenolate solution of the tar acids recovered from a suitable coal tar distillate. Other aldehyde-containing substances, and methylene containing bodies such as hexamethylenetetramine may be substituted for formaldehyde.

By the terms "varnish oil," "liquid linoxyn base," and the like as used in the specification and claims we refer to drying, semi-drying and similar oils that have been "bodied" to increase their viscosity and specific gravity to the desired degree, as by heating them to temperatures above 250° F. and passing a current of air therethrough.

The term "curable synthetic resin" and similar terms found in the specification and claims are intended to designate both completely curable resins and also those of which only a portion thereof is curable by the usual agencies employed for the purpose, such as for example heat, heat and pressure, and ultra violet light.

The invention is susceptible of modification within the scope of the appended claims.

We claim:

1. The process of rendering a curable phenol aldehyde resin soluble in a varnish oil, which comprises heating and reacting the said resin and said oil at an elevated temperature with a mutual solvent for the phenol aldehyde resin and the varnish oil, a major portion of the said solvent comprising a terpene alcohol.

2. The process of producing a high grade coating composition, which comprises dissolving a phenol formaldehyde resin in pine oil, mixing the resultant solution with a liquid linoxyn resoleate solution in a volatile solvent, and heating the said mixture to a temperature capable of producing reaction between the various components of the mixture to produce a high grade coating composition.

3. The process of producing a high grade coating composition which comprises dissolving a phenol formaldehyde resin in pine oil in the proportions of 4¼ pounds of the said resin to 2 gallons of pine oil, adding thereto approximately 2½ gallons of a liquid linoxyn resoleate solution and heating the mixture to a temperature above 150° F., until the necessary reactions have occurred and the desired coating composition is obtained.

4. The process as defined in claim 3 in which the resin is of the type obtained by treating an alkali phenolate solution of the tar acid components of a primary coal tar distillate of boiling range up to 300° C., with a substance containing a reactive methylene radical and by thereafter precipitating the resin from the said solution.

5. The process as defined in claim 3 in which the linoxyn resoleate solution contains approximately 36% of linseed linoxyn base, 4% of a mixture of a metallic resinate, and 60% of solvent naphtha.

6. The process as defined in claim 3 in which the reaction mixture is heated to approximately 350° F. until the desired reaction has occurred and a product of the desired physical property is obtained.

7. A composition of matter comprising the homogeneous reaction product obtained by heating and reacting together the ingredients of a solution of a phenol aldehyde resin in a solvent therefor containing a large amount of a terpene alcohol, and an oily bodying material soluble in the terpene alcohol but normally insoluble in the said resin.

8. A composition of matter comprising the homogeneous reaction product obtained by heating and reacting a solution in pine oil of a curable phenol formaldehyde resin and a liquid linoxyn base.

9. A composition of matter comprising the homogeneous reaction product obtained by heating and reacting a pine oil solution of a curable phenol formaldehyde resin, a blown drying oil, a metallic drier, and a high boiling water-insoluble volatile solvent.

10. A composition of matter comprising the homogeneous reaction product obtained by heating to temperatures between 150° F. and 450° F. and reacting a pine oil solution containing a phenol formaldehyde resin at least a portion of which is curable, a liquid linseed linoxyn base, and a high boiling solvent naphtha, which reaction product when heated to a baking temperature becomes insoluble in the usual organic solvents, and fatty oils, and yields a film which is elastic, strongly adherent to metal and the like, is highly resistant to alkalies and to acids, and has a high dielectric value.

11. A varnish base of relatively low acid number capable of mixing with basic pigments, fillers, dyes, and the like without causing livering of the mixture and precipitation of the dye material, which base comprises the homogeneous reaction product obtained by reacting at temperatures within the range of 150° to 450° F. a liquid linoxyn base with a solution of a phenol formaldehyde resin, at least a portion of which is curable, in a terpene alcohol.

12. A coating composition comprising the product formed by heating and reacting together a phenol aldehyde resin, at least a portion of which is curable, a liquid linoxyn base, and a liquid containing a major portion of a terpene alcohol, which composition is soluble in benzine, benzol, and solvent naphtha.

13. A water-resistant coating composition which comprises the product formed by heating and reacting a phenol formaldehyde resin, at least a portion of which is curable, a liquid linoxyn base, an alcohol of the terpan group, and a wax.

14. The process of producing a coating composition which comprises dissolving a phenol aldehyde resin containing curable components in a terpene alcohol while heating the same, mixing the resultant solution with a liquid polymerized varnish oil base and heating and reacting the ingredients of this mixture at a temperature within the range of 150° to 450° F., thereby producing a clear, homogeneous coating composition.

15. The process of producing a coating composition which comprises dissolving under the influence of heat, a phenol formaldehyde resin, containing curable components in an alcohol of the terpan group, mixing the resultant solution with a liquid polymerized varnish oil base, and heating and reacting the ingredients of this mixture at a temperature within the range of 350° to 450° F., thereby producing a clear homogeneous coating composition.

16. The process of producing a coating composition which comprises dissolving in pine oil under the influence of heat a phenol formaldehyde resin containing curable components, mixing the resultant solution with a liquid polymerized varnish oil base, and heating and reacting the ingredients of this mixture at a temperature within the range of 150° to 450° F., while bodying the same, thereby producing a clear, homogeneous coating composition.

17. Process of preparing compositions which comprises mixing a hardenable phenol-aldehyde condensation product with an oxidized air-drying fatty oil in the presence of an oxygen-carrying catalyst.

18. As a composition of matter suitable for coatings a product comprising a hardenable phenol-aldehyde condensation product and an oxidized air-drying fatty oil incorporated therewith.

19. A composition comprising a hardenable phenol-aldehyde condensation product, an oxidized air-drying fatty oil and a solvent therefor.

20. Process of preparing compositions which comprises mixing a hardenable phenol-aldehyde condensation product with an oxidized air-drying fatty oil in a solvent for both components and with the application of heat.

21. Process of preparing compositions which comprises mixing a hardenable phenol-aldehyde condensation product with an oxidized air-drying fatty oil in a solvent for both components and with the application of heat in the presence of an oxygen-carrying catalyst.

22. As a composition of matter a product obtained by mixing a hardenable phenol-aldehyde condensation product and an oxidized air-drying fatty oil in a solvent for both components with the application of heat.

23. The process of producing a relatively non-hygroscopic base for a coating composition which comprises heating and reacting a mixture containing a heat hardenable resin of the group consisting of polyhydric alcohol-polybasic acid resins, urea resins, ketone resins, and phenol aldehyde resins, together with a fatty oil, and a pine oil, thereby producing a homogeneous liquid which is soluble within wide limits in benzol, solvent naphtha, and solvent mixture containing the same.

24. The process of producing a coating composition which comprises dissolving an at least partially curable phenol formaldehyde resin in pine oil, mixing the resultant solution with a plasticizing oil normally insoluble in the resin but soluble in pine oil, and capable of reacting with the resin at elevated temperatures in pine oil solution to plasticize the said resin and to produce a coating base, and heating and reacting the mixture at a temperature within the range of 150° to 450° F. while bodying the same, thereby producing the said coating composition.

25. A process of rendering a heat hardenable phenol-aldehyde resin soluble in an oxidized drying oil which comprises heating and reacting said resin and said oil at an elevated temperature with a mutual solvent for the phenol-aldehyde resin and the oxidized oil, a major portion of said solvent comprising a terpene alcohol.

26. A composition comprising a heat hardenable phenol-aldehyde condensation product, an oxidized air drying fatty oil and a terpene alcohol solvent therefore.

27. A process of preparing a composition which comprises mixing a heat hardenable phenol-aldehyde condensation product with an oxidized air drying fatty oil in a terpene alcohol solvent for both components and with the application of heat.

28. As a composition of matter, a product obtained by mixing a heat hardenable phenol-aldehyde condensation product and an oxidized air drying fatty oil in a terpene alcohol solvent for both components with the application of heat.

29. The process of producing a lacquer base which comprises dissolving an at least partially curable phenol-formaldehyde resin in pine oil, mixing the resultant solution with a plasticizing oil normally insoluble in the synthetic resin but soluble in pine oil, and capable of reacting with the synthetic resin at elevated temperatures in pine oil solution to plasticize the said resin and to produce a lacquer base and heating and reacting the mixture at a temperature within the range of 150° to 450° F. while bodying the same, thereby producing said lacquer base, said phenol-formaldehyde resin being of the type produced by the reaction between a substance containing a reactive methylene group and a low temperature coal tar distillate.

KARL H. FULTON.
GEORGE L. BALL.